(12) United States Patent
Hammer et al.

(10) Patent No.: US 8,736,172 B2
(45) Date of Patent: May 27, 2014

(54) VEHICLE LIGHTING ARRANGEMENT

(75) Inventors: Markus Hammer, Pielenhofen (DE); Guenther Ruhl, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 224 days.

(21) Appl. No.: 13/440,346

(22) Filed: Apr. 5, 2012

(65) Prior Publication Data
US 2012/0256542 A1    Oct. 11, 2012

(30) Foreign Application Priority Data
Apr. 7, 2011   (DE) .......................... 10 2011 016360

(51) Int. Cl.
*B60Q 1/02*    (2006.01)
(52) U.S. Cl.
USPC ............................................................ 315/77
(58) Field of Classification Search
None
See application file for complete search history.

(56) References Cited

U.S. PATENT DOCUMENTS

| | | | |
|---|---|---|---|
| 5,459,508 A * | 10/1995 | Fukushima | 348/243 |
| 7,450,085 B2 * | 11/2008 | Thielemans et al. | 345/1.1 |
| 2006/0181305 A1 * | 8/2006 | Balasubramanian et al. | 326/38 |
| 2007/0133257 A1 * | 6/2007 | Kim | 365/149 |
| 2008/0048716 A1 * | 2/2008 | Balasubramanian et al. | 326/38 |

* cited by examiner

*Primary Examiner* — Crystal L Hammond
(74) *Attorney, Agent, or Firm* — SpryIP, LLC

(57) ABSTRACT

A vehicle lighting arrangement comprising a luminous device, a luminous device driver circuit, a sensor and a nonvolatile memory, wherein the luminous device driver circuit is designed to drive the luminous device during luminous device driving such that the luminous device emits light, wherein the sensor is designed to detect a sensor state of the luminous device, and wherein the vehicle lighting arrangement is designed to read in a sensor state of the luminous device detected by the sensor and to write the read-in sensor state to the nonvolatile memory.

27 Claims, 4 Drawing Sheets

VEHICLE LIGHTING ARRANGEMENT

RELATED APPLICATIONS

This Application claims priority of DE Patent Application 102011016360.3, which was filed on Apr. 7, 2011. The entire contents of the German Patent Application are incorporated herein by reference.

BACKGROUND

After a traffic accident, for clarifying questions of blame it is necessary or helpful, inter alia, to know the operating state of lighting elements on a vehicle at the point in time of the accident. In the case of conventional incandescent bulbs, this can be done by various methods of physical analysis of the incandescent wire or of the remaining glass residues of the glass bulb. Such methods for analysis are described in [H. Burg, A. Moser, Handbuch Verkehrsunfallrekonstruktion [Handbook of traffic accident reconstruction], Vieweg+Teubner–Verlag 2009, pages 793 to 800]. In the case of new lighting solutions using LED or xenon, this is no longer possible, since the operating state no longer leaves permanent physical traces on the luminous element. Subsequently determining an illumination state at the instant of collision of an LED lamp system or of a xenon lamp system is possible only in vehicles equipped with central data recording devices.

The disadvantage of a central data recording device is that central data recording devices are very complex and expensive. Therefore, their use is restricted to the field of mid-range and top-of-the-range motor vehicles. In the case of an accident there is the risk of a line fracture or of a signal interruption generally between lighting element and central data recording device. Moreover, the central data recording system only stores desired states of the lighting element. Actual states can only be recorded after a lighting system has communicated its actual state to the central data recording device. This presupposes a certain complexity of the lighting system per se, which in turn is at odds with an economic solution. Equipment with said central data recording devices is not economic for small motor vehicles, and for motorcycles and bicycles.

SUMMARY

Therefore, in one implementation, the present invention provides a vehicle lighting arrangement and a luminous device driver circuit, and also a method, enabling subsequent determination of an illumination state of the lighting element per se.

A vehicle lighting arrangement may include a luminous device, a luminous device driver circuit, a sensor and a nonvolatile memory. The luminous device driver circuit is designed to drive the luminous device during luminous device driving such that the luminous device emits light. The sensor is designed to detect a sensor state of the luminous device. The vehicle lighting arrangement is designed to read in a sensor state of the luminous device detected by the sensor and to write the read-in sensor state to the nonvolatile memory.

The vehicle lighting arrangement can be designed to detect a temperature, a current, a voltage or a light emission of the luminous device with the sensor. The operating state of the luminous device can thereby be monitored by a current consumption, a voltage, a power consumption, a temperature or a light emission being detected by a sensor and being compared with a typical current consumption, with a typical voltage, with a typical power consumption, with a typical temperature or with a typical light emission and being evaluated. The results of the evaluation can be written as an evaluation state to the nonvolatile memory. If high deviations from typical values arise during the evaluation of the results, warning states can be written to the nonvolatile memory. The operating state of the luminous device can thereby be documented by the current consumption, the voltage, the power consumption, the temperature or the light emission being detected by a sensor and written as an operating state to the nonvolatile memory.

The sensors for detecting the current consumption, the power consumption, the voltage, the temperature or the light emission can be integrated in the luminous device driver circuit. The luminous device driver circuit can be fitted directly on or in proximity to the luminous device. If the luminous device driver circuit is fitted directly on the luminous device, a temperature sensor integrated in the luminous device driver circuit can accurately measure the temperature of the luminous device.

The vehicle lighting arrangement comprising the luminous device, the luminous device driver circuit, the sensor and the nonvolatile memory can be arranged in a housing. This affords the advantage that the vehicle lighting arrangement can be an autonomous system which can write its state to the nonvolatile memory independently of an external supervisory unit during operation. By virtue of the housing, the vehicle lighting arrangement forms a functional unit which can be used by a user as a lighting arrangement per se. The housing of the vehicle lighting arrangement can have a lampholder. By virtue of the lampholder, the housing of the vehicle lighting arrangement forms such a functional unit which can be used by a user as a replacement for conventional luminous device, such as incandescent bulbs, for example.

The luminous device of the vehicle lighting arrangement can be an LED, an incandescent lamp or a xenon lamp. What is common to the LED and the xenon lamp is that an operating state cannot subsequently be ascertained, such that a use in the vehicle lighting arrangement is advantageous for these two luminous devices. Other luminous devices can also be used. An incandescent lamp can also be used as luminous device of the vehicle lighting arrangement. A redundant detectability of an operating state arises upon the use of an incandescent lamp.

The vehicle lighting arrangement can comprise a time detection arrangement, wherein the time detection arrangement is designed to detect a time. The vehicle lighting arrangement is designed to write the time state detected by the time detection arrangement at a point in time to the nonvolatile memory. By virtue of writing a time state to the nonvolatile memory, the vehicle lighting arrangement documents that the vehicle lighting arrangement is in operation. The vehicle lighting arrangement can also write said time state to the nonvolatile memory only during luminous device driving. By virtue of writing a time state to the nonvolatile memory during luminous device driving, the vehicle lighting arrangement documents that the vehicle lighting arrangement has driven the luminous device. The time state can be stored in sliding fashion over a time period of at least two seconds. With a time period of at least two seconds, it is possible to document the behavior of a vehicle lighting arrangement for a turn signal in a motor vehicle. A flashing period of 1.5±0.5 seconds is prescribed for a turn signal.

The vehicle lighting arrangement can comprise a first and a second terminal for providing an operating voltage. The vehicle lighting arrangement can be designed to receive a synchronization signal for synchronizing the time detection arrangement using a modulation of the operating voltage. If the vehicle lighting arrangement comprises two terminals for an operating voltage, such as, for example, a holder of a conventional incandescent lamp, then information can be transmitted to the vehicle lighting arrangement by modulation of said voltage or of the current flowing through the vehicle lighting arrangement. This information can be used to synchronize the time detection arrangement such that the vehicle lighting arrangement can detect from the time detection arrangement a time state having an absolute time, or having a time which is independent of past operating states of the vehicle lighting arrangement, or having an identical time with respect to a central control unit connected to the vehicle lighting arrangement via the terminals. By virtue of the synchronization via terminals for providing the operating voltage, the vehicle lighting arrangement is compatible with a conventional lampholder, such that the vehicle lighting arrangement can be used by a user as a replacement for conventional luminous device, such as incandescent bulbs, for example.

The vehicle lighting arrangement can comprise a control terminal for connection to a control unit. The vehicle lighting arrangement can be designed to receive a synchronization signal for synchronizing the time detection arrangement via the control terminal.

The vehicle lighting arrangement can be designed to identify the start of luminous device driving and to write it as a start state to the nonvolatile memory. By virtue of writing a start state to the nonvolatile memory, the vehicle lighting arrangement documents that the vehicle lighting arrangement has started to drive the luminous device. The vehicle lighting arrangement can be designed to identify the end of luminous device driving and to write it as an end state to the nonvolatile memory. By virtue of writing an end state to the nonvolatile memory, the vehicle lighting arrangement documents that the vehicle lighting arrangement has stopped driving the luminous device. If the end of luminous device driving is signaled to the vehicle lighting arrangement by virtue of the supply voltage of the vehicle lighting arrangement being switched off, the vehicle lighting arrangement can comprise a buffer element, such as a capacitor, for example, such that the vehicle lighting arrangement is able to store enough energy to identify the end of luminous device driving and to write this as an end state to the nonvolatile memory. If the end of luminous device driving is signaled to the vehicle lighting arrangement by virtue of the vehicle lighting arrangement receiving an end signal via the control terminal or by modulation of the supply voltage, the vehicle lighting arrangement ends the luminous device driving and writes an end state to the nonvolatile memory. If it is ascertained in a subsequent analysis of the vehicle lighting arrangement after an accident, for example, that the last written state was an end state, it can thereby indubitably be deduced that the vehicle lighting arrangement did not drive the luminous device during the accident.

The vehicle lighting arrangement can be designed to write, during luminous device driving at time intervals, a sensor state of the luminous device detected by the sensor at this point in time to the nonvolatile memory. The vehicle lighting arrangement can detect a temperature, a current, a voltage, a power or a light emission of the luminous device. If it is ascertained in a subsequent analysis of the vehicle lighting arrangement after an accident, for example, that no end state follows after a written start state, it can thereby indubitably be deduced that the vehicle lighting arrangement drove the luminous device during the accident. If it is furthermore ascertained that, after a written start state, a very large current or no current flowed through the luminous device, it can thereby be deduced that although the vehicle lighting arrangement drove the luminous device during the accident, the luminous device did not illuminate owing to a short circuit or owing to a non-flowing current.

The vehicle lighting arrangement can be designed to write a sensor state, a start state, an end state with a time stamp dependent on the time detection arrangement to the nonvolatile memory. With a subsequent analysis of the vehicle lighting arrangement after an accident, with the aid of the time stamp it is possible to reconstruct a state profile of the luminous device independently of a central control unit. If, in the case of a vehicle lighting arrangement, for cost reasons, for example, the size of the nonvolatile memory is intended to be limited, or kept small, the start states and the end states can preferably be stored, such that a number of start and end states cannot be overwritten by the sensor states detected at time intervals.

A luminous device driver circuit for a vehicle lighting arrangement, for operating a luminous device, is designed, during luminous device driving, to drive a luminous device such that the luminous device emits light. The luminous device driver circuit can read in a sensor state of the luminous device detected by a sensor, and write this read-in sensor state to a nonvolatile memory. The luminous device driver circuit can be designed to drive an LED, a xenon lamp or an incandescent lamp. The luminous device driver circuit can be embodied as an integrated circuit. The luminous device driver circuit can comprise a current sensor for detecting the current of the luminous device. The current sensor can be embodied as a resistor, for example. The luminous device driver circuit can comprise a voltage sensor for detecting the operating voltage of the luminous device. If the luminous device driver circuit determines the current and voltage of the luminous device, the consumed power of the luminous device can be determined.

The luminous device driver circuit can comprise a temperature sensor for detecting a temperature. The luminous device driver circuit can be fitted directly on or in proximity to the luminous device. If the luminous device driver circuit is fitted directly on the luminous device, the temperature sensor integrated in the luminous device driver circuit can accurately measure the temperature of the luminous device. For accurately detecting the luminous device temperature, the temperature sensor of the luminous device driver circuit can be connected to the luminous device by a temperature coupling element. The temperature coupling element can be, for example, a metallic wire or a conductor track of a circuit board.

The luminous device driver circuit can comprise a light sensor for detecting a light emission of the luminous device. If the luminous device driver circuit is embodied as an integrated circuit, a light sensor or photosensor can be directly integrated in this integrated circuit.

The luminous device driver circuit can comprise a time detection arrangement. The time detection arrangement is designed to detect a time. The luminous device driver circuit is designed to write the time state detected by the time detection arrangement at a point in time to the nonvolatile memory.

The luminous device driver circuit can comprise a first and a second terminal for providing an operating voltage, wherein the luminous device driver circuit is designed to receive a synchronization signal for synchronizing the time detection arrangement using a modulation of the operating voltage.

The luminous device driver circuit can comprise a control terminal for connection to a control unit, wherein the luminous device driver circuit is designed to receive a synchronization signal for synchronizing the time detection arrangement via the control terminal.

The luminous device driver circuit can be designed to identify the start of luminous device driving and to write it as a start state to the nonvolatile memory.

The luminous device driver circuit can be designed to identify the end of luminous device driving and to write it as an end state to the nonvolatile memory.

The luminous device driver circuit can be designed to write, during luminous device driving at time intervals, a sensor state of the luminous device detected by the sensor at this point in time to the nonvolatile memory.

The luminous device driver circuit can be designed to write a sensor state, a start state, an end state with a time stamp dependent on the time detection arrangement to the nonvolatile memory.

A method for providing information for determining an illumination state of a vehicle lighting arrangement, wherein, on the basis of the measurement of a sensor, a sensor state of a luminous device is detected during luminous device driving of the vehicle lighting arrangement, and wherein the detected sensor state of the luminous device is written to a nonvolatile memory.

The method for providing information, wherein, on the basis of a time detection arrangement, a time state is detected, and wherein the detected time state is written to the nonvolatile memory.

The method for providing information, wherein, on the basis of the reception of a synchronization signal, the time detection arrangement is synchronized.

The method for providing information, wherein the start of luminous device driving is identified as a start state, and the start state is written to the nonvolatile memory.

The method for providing information, wherein the end of luminous device driving is identified as an end state, and the end state is written to the nonvolatile memory.

The method for providing information, wherein, during luminous device driving, the detected sensor states of the luminous device at time intervals are written to the nonvolatile memory.

The method for providing information, wherein a sensor state, a start state, an end state with a time stamp dependent on the time detection arrangement are/is written to the nonvolatile memory.

BRIEF DESCRIPTION OF DRAWINGS

Embodiments are explained in greater detail below with reference to the following drawings.

DESCRIPTION

Figure 1:
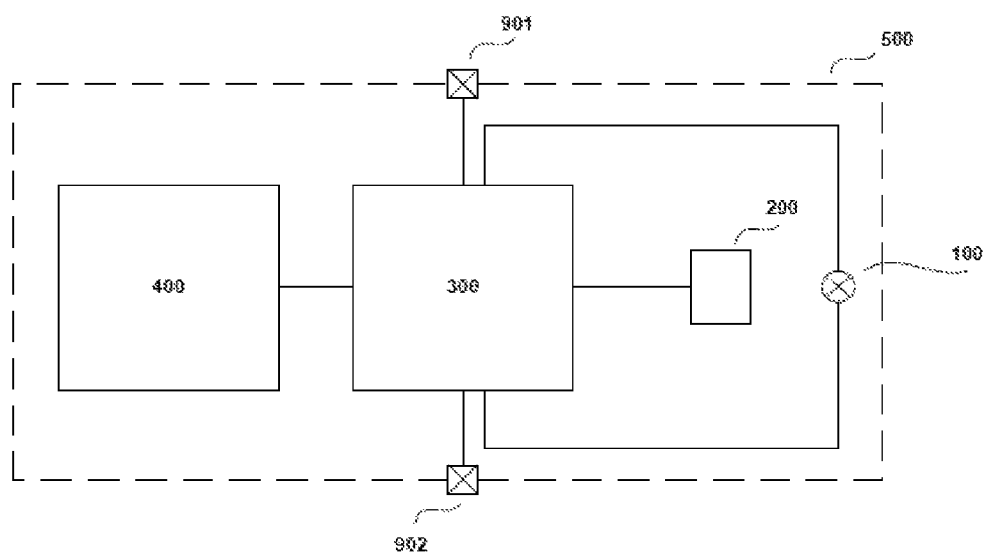
FIG. 1 shows a first embodiment of a vehicle lighting arrangement comprising a luminous device driver circuit.

FIG. 1 shows a first exemplary embodiment of a vehicle lighting arrangement 500 comprising a luminous device 100, a sensor 200, a luminous device driver circuit 300, a nonvolatile memory 400 and a luminous device 100. The vehicle lighting arrangement comprises two terminals 901, 902, to which an operating voltage can be applied. The luminous device driver circuit 300 is connected to a sensor 200 and a non-volatile memory 400. The sensor 200 can be embodied as current sensor, voltage sensor, temperature sensor, power sensor or as light sensor. If sensor 200 is embodied as current sensor, the sensor 200 can detect the current flowing through the luminous device. If sensor 200 is embodied as voltage sensor, the sensor 200 can detect the voltage present across the luminous device. If sensor 200 is embodied as temperature sensor, the sensor 200 can detect the temperature of the luminous device 100. The temperature sensor can be arranged directly on the luminous device 100 or in direct proximity to the luminous device 100 or in the same housing as the luminous device 100. If the temperature sensor is arranged directly on the luminous device 100, this has the advantage that the temperature of the luminous device can be detected with high accuracy. If the temperature sensor is arranged in the same housing as the luminous device 100, this has the advantage that the temperature of the luminous device 100 can be detected with sufficient accuracy and the vehicle lighting arrangement 500 is simple and cost-effective to manufacture. If sensor 200 is embodied as light sensor, the sensor 200 can detect the emitted light of the luminous device 100. Simple light sensors are simple to realize in integrated circuits. The light sensor can be arranged such that it can detect part of the light of the luminous device 100.

The luminous device driver circuit 300 can read out the values detected by the sensor 200 and write them to the nonvolatile memory. The vehicle lighting arrangement 500 comprises two terminals 901, 902, at which an operating voltage can be provided. The luminous device driver circuit 300 is connected to said terminals 901, 902. The luminous device driver circuit is designed in such a way that it can drive LEDs or xenon lamps or incandescent lamps if an operating voltage is provided at the terminals 901, 902. A suitable luminous device driver circuit is, for example, a linear regulator or a DC/DC regulator.

Figure 2:
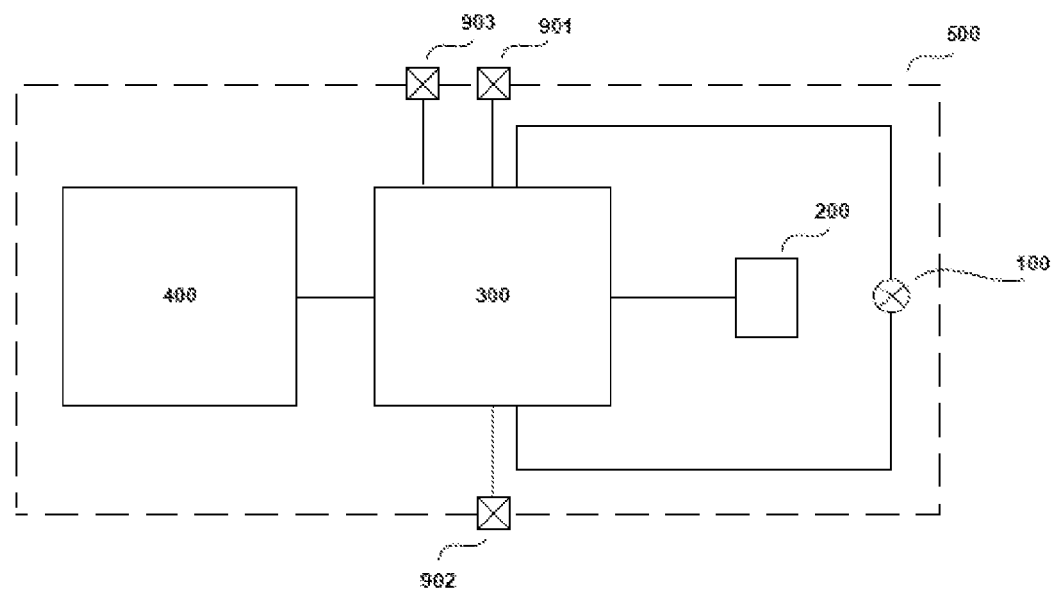
FIG. 2 shows a second embodiment of a vehicle lighting arrangement comprising a luminous device driver circuit.

FIG. 2 shows a second exemplary embodiment of a vehicle lighting arrangement 500, which differs from the first exemplary embodiment in that the vehicle lighting arrangement 500 comprises a control terminal 903. The control terminal 903 is connected to the luminous device driver circuit 300. The vehicle lighting arrangement 500 is designed to receive a synchronization signal for synchronizing a time detection arrangement via the control terminal 903. The vehicle lighting arrangement 500 can receive, via the control terminal 903, a signal which indicates to the vehicle lighting arrangement 500 that the luminous device driver circuit 300 is intended to drive the luminous device 100. If the fact of when the luminous device driver circuit 300 is intended to drive the luminous device 100 is indicated to the vehicle lighting arrangement 500 via the control terminal 903, the operating voltage can be provided permanently at the terminals 901, 902.

Figure 3:
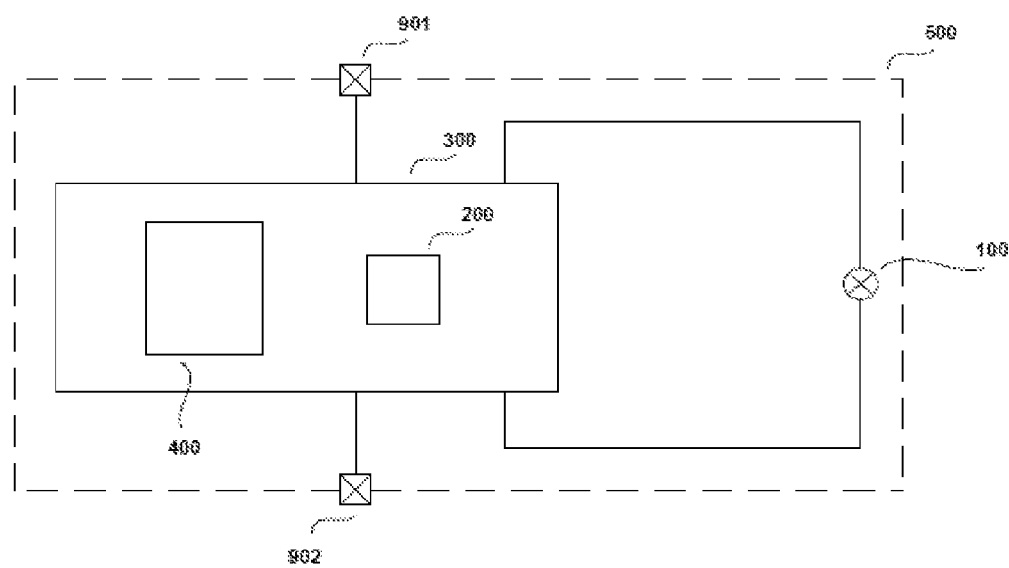
FIG. 3 shows a third embodiment of a vehicle lighting arrangement comprising a luminous device driver circuit.

FIG. 3 shows a third exemplary embodiment of a vehicle lighting arrangement 500, which differs from the first exemplary embodiment in that the sensor 200 and the non-volatile memory 400 are integrated in the luminous device driver circuit 300.

Figure 4:
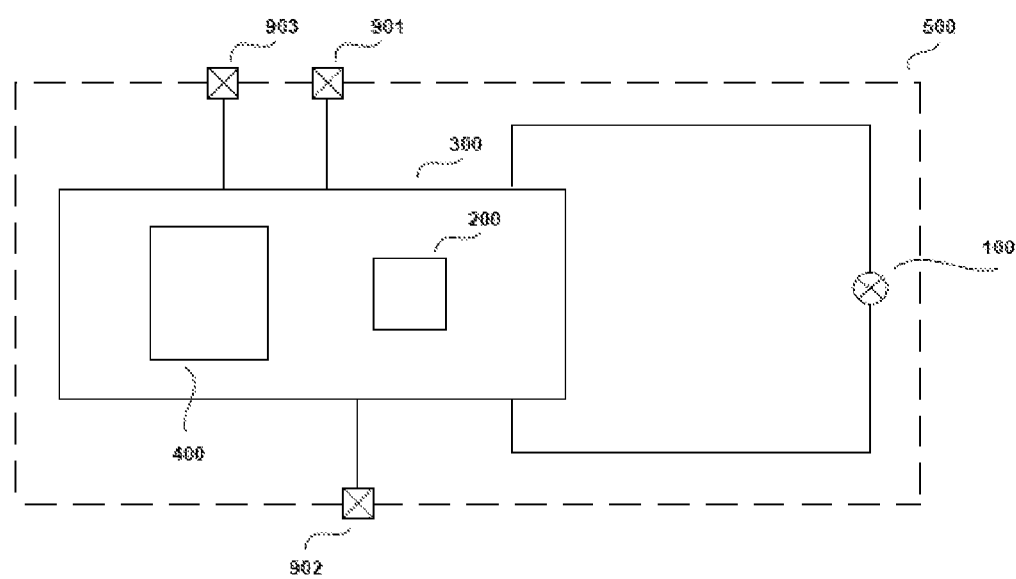
FIG. 4 shows a fourth embodiment of a vehicle lighting arrangement comprising a luminous device driver circuit.

FIG. 4 shows a fourth exemplary embodiment of a vehicle lighting arrangement 500, which differs from the second exemplary embodiment in that the sensor 200 and the non-volatile memory 400 are integrated in the luminous device driver circuit 300.

What is claimed is:
1. A vehicle lighting arrangement, comprising:
a luminous device,
a luminous device driver circuit,
a sensor and
a nonvolatile memory, wherein the luminous device driver circuit is designed to drive the luminous device during luminous device driving such that the luminous device emits light, wherein the sensor is designed to detect a sensor state of the luminous device, and wherein the vehicle lighting arrangement is designed to read in a sensor state of the luminous device detected by the sensor and to write the read-in sensor state to the nonvolatile memory.

2. The vehicle lighting arrangement as claimed in claim 1, wherein the sensor is to detect a temperature, a current, or a light emission of the luminous device.

3. The vehicle lighting arrangement as claimed in claim 1, wherein the luminous device, the luminous device driver circuit, the sensor and the nonvolatile memory are arranged in a housing.

4. The vehicle lighting arrangement as claimed in claim 3, wherein the housing has a lampholder.

5. The vehicle lighting arrangement as claimed in claim 1, wherein the luminous device is an LED, an incandescent lamp or a xenon lamp.

6. The vehicle lighting arrangement as claimed in claim 1, further comprising a time detection arrangement, wherein the time detection arrangement is designed to detect a time, wherein the vehicle lighting arrangement is designed to write the time state detected by the time detection arrangement at a point in time to the nonvolatile memory.

7. The vehicle lighting arrangement as claimed in claim 6, further comprising a first and a second terminal for providing an operating voltage, wherein the vehicle lighting arrangement is to receive a synchronization signal for synchronizing the time detection arrangement by using a modulation of the operating voltage.

8. The vehicle lighting arrangement as claimed in claim 6, further comprising a control terminal for connection to a control unit, wherein the vehicle lighting arrangement is to receive a synchronization signal for synchronizing the time detection arrangement via the control terminal.

9. The vehicle lighting arrangement as claimed in claim 6, wherein the vehicle lighting arrangement is to write a sensor state and/or a start state and/or an end state with a time stamp dependent on the time detection arrangement to the nonvolatile memory.

10. The vehicle lighting arrangement as claimed in claim 1, wherein the vehicle lighting arrangement is to identify the start of luminous device driving and to write it as a start state to the nonvolatile memory.

11. The vehicle lighting arrangement as claimed in claim 1, wherein the vehicle lighting arrangement is designed to identify the end of luminous device driving and to write it as an end state to the nonvolatile memory.

12. The vehicle lighting arrangement as claimed in claim 1, wherein the vehicle lighting arrangement is to write, during luminous device driving at time intervals, a sensor state of the luminous device detected by the sensor at this point in time to the nonvolatile memory.

13. A luminous device driver circuit for a vehicle lighting arrangement, wherein the luminous device driver circuit is to drive a luminous device during luminous device driving such that the luminous device emits light, wherein the luminous device driver circuit is to read in a sensor state of the luminous device detected by a sensor, and wherein the luminous device driver circuit is to write the read-in sensor state to a nonvolatile memory.

14. The luminous device driver circuit as claimed in claim 13, further comprising a time detection arrangement, wherein the time detection arrangement is to detect a time, wherein the luminous device driver circuit is to write the time state detected by the time detection arrangement at a point in time to the nonvolatile memory.

15. The luminous device driver circuit as claimed in claim 14, further comprising a first and a second terminal for providing an operating voltage, wherein the luminous device driver circuit is to receive a synchronization signal for synchronizing the time detection arrangement by using a modulation of the operating voltage.

16. The luminous device driver circuit as claimed in claim 14, further comprising a control terminal for connection to a control unit, wherein the luminous device driver circuit is to receive a synchronization signal for synchronizing the time detection arrangement via the control terminal.

17. The luminous device driver circuit as claimed in claim 14, wherein the luminous device driver circuit is designed to write a sensor state, a start state, or an end state with a time stamp dependent on the time detection arrangement to the nonvolatile memory.

18. The luminous device driver circuit as claimed in claim 13, wherein the luminous device driver circuit is to identify the start of luminous device driving and to write it as a start state to the nonvolatile memory.

19. The luminous device driver circuit as claimed in claim 13, wherein the luminous device driver circuit is to identify the end of luminous device driving and to write it as an end state to the nonvolatile memory.

20. The luminous device driver circuit as claimed in claim 13, wherein the luminous device driver circuit is to write, during luminous device driving at time intervals, a sensor state of the luminous device detected by the sensor at this point in time to the nonvolatile memory.

21. A method for providing information for determining an illumination state of a luminous device of a vehicle lighting arrangement, comprising:
    detecting a sensor state of the luminous device during luminous device driving of the vehicle lighting arrangement, and
    writing the detected sensor state of the luminous device to a nonvolatile memory.

22. The method for providing information as claimed in claim 21, further comprising detecting a time state and writing the detected time state to the nonvolatile memory.

23. The method for providing information as claimed in claim 22, further comprising, on the basis of a synchronization signal, synchronizing a time detection arrangement.

24. The method for providing information as claimed in claim 21, wherein a start of luminous device driving is identified as a start state, and the start state is written to the nonvolatile memory.

25. The method for providing information as claimed in claim 21, wherein the end of luminous device driving is identified as an end state, and the end state is written to the nonvolatile memory.

26. The method for providing information as claimed in claim 21, further comprising, during luminous device driving, writing detected sensor states of the luminous device at time intervals to the nonvolatile memory.

27. The method for providing information as claimed in claim 21, wherein a sensor state, a start state, or an end state with a time stamp dependent on the time detection arrangement is written to the nonvolatile memory.

* * * * *